Jan. 13, 1970        J. G. GILES        3,489,035
VARIABLE RATIO TRANSMISSION
Filed June 20, 1968
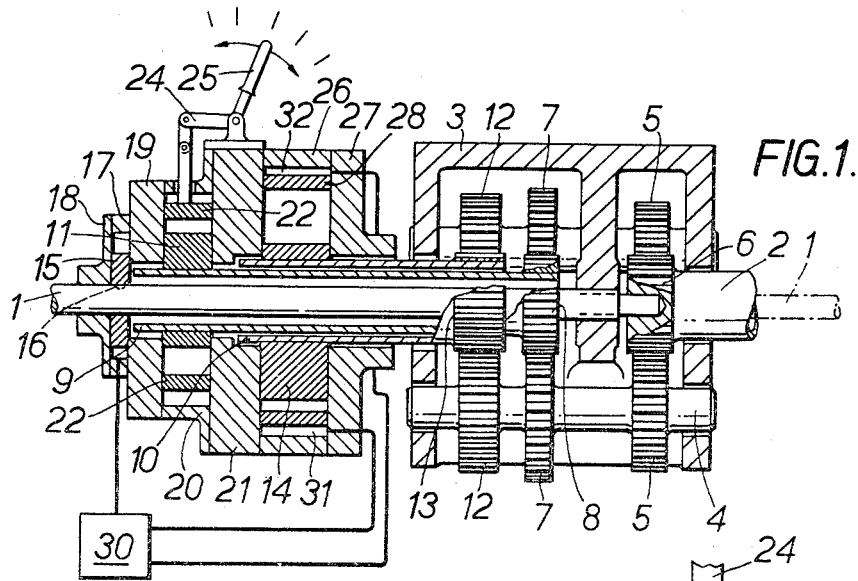
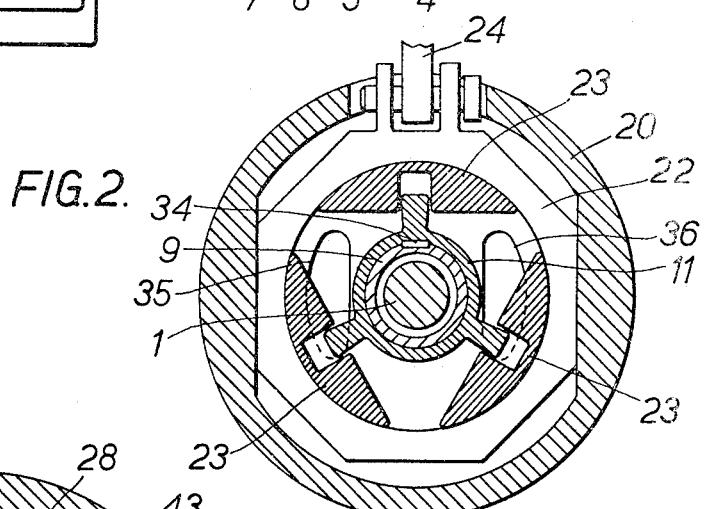
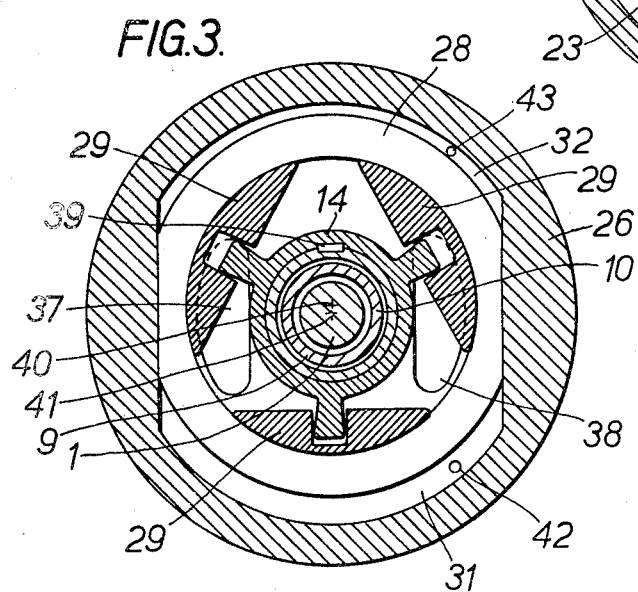
INVENTOR
John George Giles
BY Glascock, Downing &
Seebold
ATTORNEYS United States Patent Office 3,489,035
Patented Jan. 13, 1970

1

3,489,035
VARIABLE RATIO TRANSMISSION
John George Giles, "Reed Lea," 12 Whittington Road,
Worcester, England
Filed June 20, 1968, Ser. No. 738,583
Int. Cl. F16h 47/04
U.S. Cl. 74—687                               5 Claims

ABSTRACT OF THE DISCLOSURE

A variable ratio transmission comprising an input shaft and an output shaft, a hydraulic motor drivable by the output of a hydraulic pump, and an epicyclic gear assembly which comprises a planet gear carrier rotatable with the input shaft, said planet gear carrier having a plurality of shafts on each of which are mounted three planet gears respectively meshed with three co-axial gears which are themselves connected to the hydraulic pump, the hydraulic motor and the output shaft.

---

The invention relates to a variable ratio transmission for transmitting power from an engine to an output shaft which may be required to rotate at different speeds of rotation whilst delivering power. One object of the invention is to provide an improved transmission which has torque conversion ratios so that any ratio within its range can be obtained. It is another object of the invention to provide a transmission in which a number of fixed transmission ratios (such as reverse and low gear) which are needed for particular applications can be obtained.

In accordance with the invention there is provided a variable ratio transmission comprising a drivable input shaft, an output shaft, a hydraulic pump and a hydraulic motor which are interconnected so that the output of the pump is the input of the motor, and an epicyclic gear assembly which comprises a planet gear carrier connected to said input shaft, a plurality of shafts rotatably mounted in said carrier, three planet gears mounted on each of said shafts so as to be rotatable therewith and three co-axial gears which are respectively in mesh with the three planet gears on each of said shafts, said co-axial gears being themselves respectively connected to the hydraulic pump, the hydraulic motor and the output shaft.

The hydraulic pump and hydraulic motor form hydraulic units which may each be of the slipper-vane type, and these said hydraulic units are arranged so as to form a closed cycle hydraulic drive between two of the co-axial gears (e.g. sun gears) in the planetary gear assembly. In this closed cycle hydraulic drive, the discharge from the hydraulic pump is directed into the hydraulic motor and fluid discharged from the motor unit returns to the inlet of the hydraulic pump.

Control of the transmission is partly by manual selection and partly by automatic operation. The delivery control of the hydraulic pump is operated manually and in the case of slipper vane type hydraulic units, this manual control is connected directly by mechanical linkage to the vane track or guide ring of the pump. By this control the fluid delivery of the pump may be adjusted to any of a number of required settings such as maximum (positive) delivery, half maximum delivery (positive), zero delivery, half maximum (negative) delivery, maximum (negative) delivery. The positive and negative designations indicate that fluid flow may reverse direction or alternatively that the direction of pump rotation may change. Thus, in the case of slipper-vane hydraulic units the guide ring (or vane track) may be moved from a position of maximum eccentricity on one side of the rotor center to a position of half maximum eccentricity, to a concentric position, to half maximum eccentricity, or to maximum eccentricity on the other side of the rotor center in order to achieve the required fluid delivery settings of the unit. The pump delivery setting is fixed at one of the specified positions and remains at that setting until the manual lever is moved again.

Fluid flow through the hydraulic motor unit is controlled in the same way as for the pump unit, i.e. by movement of the guide ring (vane track) which can move from a concentric position (zero fluid delivery) to a position of eccentricity on either side of the rotor center (positive or negative eccentricity). The adjustment of the motor guide ring is, however, made by an automatic control which admits fluid under pressure to one side or other of the guide ring to vary the fluid flow through the hydraulic motor. The delivery setting of the hydraulic motor will thus be changing constantly under normal operation of the transmission in order to vary the transmission ratio in accordance with the requirements of the automatic controller.

The transmission input shaft is connected to the planet carrier of the planetary gear assembly. This planet carrier supports a plurality of sets of planet gears whose axes lie parallel to the input and output shafts, each set consisting of three pinion gears mounted side by side and fixed to a planet shaft so as to mesh with one of three co-axial gears (e.g. sun gears) which are co-axial with the central axis. One of these sun gears is the output sun gear and is connected to the output shaft or other output member. The two remaining sun gears are termed the pump sun gear and motor sun gear respectively and are mounted on short hollow concentric shafts connected to the pump and motor rotors. The pump and motor rotors are hollow and are co-axial so as to permit the concentric arrangement and to allow for an input or output member to be connected through the center of the hydraulic drive. A small auxiliary hydraulic pump is driven by the input shaft to provide a small supply of fluid at pressure to ensure that the hydraulic drive is maintained at about five atmospheres pressure, for lubrication purposes, and as a power supply for the automatic controller.

Output speed variation and torque conversion in the transmission is obtained by adjustment of the drive ratio between the hydraulic pump and motor so that the motor sun gear and pump sun gear are connected at differing speed ratios. Changes in the speeds of these two sun gears, which act as control members, are reflected in the gearing by changes in the torque and speed of the output sun gear. Output speed and torque of the transmission are mathematically related to the speeds and torques of these control members and the sizes of the hydraulic pump and motor are fixed by this relationship. Control of the overall transmission ratio is effected by making appropriate changes in the hydraulic drive ratio which, in turn, is adjusted by making suitable changes in the fluid delivery settings of the hydraulic pump and motor units. Thus, the required ranges of transmission ratio are obtained by adjustment of the hydraulic pump whose fluid delivery is adjusted by means of a manual lever, and by adjustment of the hydraulic motor whose fluid delivery is adjusted by an automatic control which can select a fixed delivery setting or may adjust the fluid flow continuously over a range of settings in accordance with the required characteristics of the automatic controller.

The invention will now be described with reference to the accompanying drawings wherein FIGURE 1 is sectional side view of one example of a transmission in accordance with the invention, FIGURE 2 is a sectional end view of the hydraulic pump of the transmission shown in FIGURE 1.

FIGURE 3 is a sectional end view of the hydraulic motor of the transmission.

Referring to FIGURE 1, input to the transmission is provided by an input shaft 1 which may be connected to an internal combustion engine and which runs concentrically through the center of the transmission. The output shaft 2 is a hollow shaft so that where necessary the input shaft (as shown in dotted lines) may be arranged at the opposite end of the transmission. The input shaft is connected to a planet carrier 3 in which is mounted a plurality of sets of planet gears, each set comprising three gears fixed to a planet shaft 4 rotatably mounted in the carrier.

The three planet gears on each shaft are respectively in mesh with three co-axial gears in the form of sun gears. Thus, planet gears 5 mesh with the output sun gear 6 mounted on the output shaft 2. Planet gears 7 mesh with the pump sun gear 8 which runs concentrically outside the input shaft 1, this pump sun gear 8 being fixed to a pump shaft 9 which runs concentrically inside a motor shaft 10 and which drives the pump rotor 11. Planet gears 12 mesh with the motor sun gear 13 which is connected to the motor shaft 10 and the motor rotor 14 so as to be driven thereby.

The input shaft 1 also drives a priming or auxiliary pump rotor 15 by means of a key 16, the said rotor 15 being contained in a casing 17 which in turn is bolted to a pump front plate 18 and pump rear plate 19. Pump rotor 11 is mounted inside the pump casing 2 which is fixed between the pump rear plate 19 and the motor front plate 21. A pump guide ring 22 is slidable inside this pump casing 20 and adjusts the position of the pump slipper vanes or slippers which rotate inside the guide ring 22 and which are driven around inside this guide ring by the pump rotor 11. The position of the pump guide ring 22 is itself adjusted by means of a mechanical linkage 24 and manual lever 25 which may be locked into any one of a number of set positions.

The motor casing 26 is fixed between motor front plate 21 and motor rear plate 27 and acts as a guide for the motor guide ring 28 which is slidable in this casing. The motor guide ring 28 adjusts the position and track of the motor slippers which engage with the motor rotor 14 and which are driven around inside the motor guide ring 28 by that rotor 14. The hydraulic drive comprising the pump and motor is mounted as a complete self-contained assembly on the input shaft and provides bearings for input shaft 1, pump shaft 9 and motor shaft 10 which rotate inside that assembly. Ports inside the pump rear plate 19 and motor front plate 21 transfer fluid from the pump to motor and return and allow the flow of fluid from the priming pump.

The position of the motor guide ring is itself adjusted by an automatic controller 30 which employs fluid pressure obtained from the hydraulic drive and admits fluid to one of the chambers 31, 32, existing between the motor guide ring 28 and motor casing 26 so as to adjust the eccentricity of that guide ring relative to the motor rotor 14.

FIGURE 2 shows a sectional view of the manually controlled pump unit. The pump rotor 11 is driven by the hollow pump shaft 9 shown in this illustration to be connected by means of a key 34 but alternative methods of connection may be used. This hollow rotor shaft 9 permits the passage of the input shaft 1 through the centre of the pump unit. Three slippers 23 engage with the arms of the pump rotor 11 and are driven around inside the pump guide 22 when this rotor is rotated by the rotor shaft. Ports 35, 36, are positioned in the motor front plate and allow fluid to fill the spaces between these slippers. The guide ring 22 is slidable in the pump casing 20 and as previously mentioned may be positioned by mechanical linkage 24 so that the guide ring center lies above or below the rotor center. As the pump rotor rotates inside the eccentric guide ring, the volume of fluid trapped between adjacent slippers and rotor arms varies during one revolution. The ports 35, 36 are positioned so that fluid is drawn in one port when the trapped volume is increasing, fluid being discharged out of the other port when the volume is decreasing. The rotor may be driven in either direction depending on the planetary gear rotations and each port will operate either as an inlet or an outlet port.

FIGURE 3 shows a section through the hydraulic motor whose ports 37, 38 coincide with the pump ports 35, 36. The motor rotor 14 is connected by means of a key 39, in this illustration, to the motor shaft 10 which is hollow so that the input shaft 1 and pump shaft 9 may pass through its centre. Slippers 29 engage with the rotor-arms and rotate inside and around the motor guide ring 28 when the motor shaft 10 is rotated. Depending on the position of this guide ring 28 which is slidable in the motor casing 26, the guide ring center 40 can lie above or below the rotor center 41. As seen in this illustration the guide ring center 40 lies above the rotor center 41, so that the trapped volume between the two slippers at the top of this unit is the maximum value for that setting or eccentricity of the guide ring. Any movement of the rotor from the position shown will tend to compress the fluid because the volume between adjacent slippers will decrease as the rotor moves until these two slippers lie at the bottom of the guide ring (180° of rotation) when the minimum volume is reached. If the rotor moves clockwise the right hand port 38 acts as the outlet port and the left hand port 37 becomes the inlet port. The flow of fluid through the ports will reverse if the rotor changes direction, or if the guide ring center moves past the rotor center. The position of the guide ring 28 is adjusted by transfer of fluid from one of the chambers 31 existing between said guide ring 28 and the motor casing 26, to the other chamber 32, such fluid transfer being made via small ducts 42, 45 in the motor rear plate.

In the above description reference is made to an hydraulic pump and an hydraulic motor but it is of course to be understood that the functions of these units may be interchanged over part of the operating range of the transmission. Thus the pump unit will act as an hydraulic motor when its direction of rotation is reversed and similarly the motor unit, on reversal, will act as an hydraulic pump.

Having thus described my invention, what I claim as new and desire to secure by Letters Patent is:

1. A variable ratio transmission comprising a drivable input shaft, an output shaft, an hydraulic pump and an hydraulic motor which are interconnected so that the output of the pump is the input of the motor, and an epicyclic gear assembly which comprises a planet gear carrier connected to said input shaft, a plurality of shafts rotatably mounted in said carrier, three planet gears mounted on each of said planet gear carrier shafts so as to be rotatable therewith and three co-axial gears which are respectively in mesh with the three planet gears on each of said planet gear carrier shafts, said co-axial gears being themselves respectively connected to the hydraulic pump, the hydraulic motor and the output shaft.

2. A variable ratio transmission as claimed in claim 1 wherein means are provided for varying the output of the hydraulic pump and further means are provided for varying the flow of fluid through said hydraulic motor.

3. A variable ratio transmission as claimed in claim 2 wherein said first-mentioned means is manually controllable and said further means is automatically controllable.

4. A variable ratio transmission as claimed in claim 2 wherein the hydraulic pump and hydraulic motor each include a vaned rotor and an adjustable guide ring having a guide surface which is engageable by the vanes of the rotor, said means for varying the output of the pump and said further means for varying the flow of fluid through the motor being respectively connected to the two guide rings whereby each guide ring can be set in a position which is either concentric or eccentric with respect to the associated rotor.

5. A variable ratio transmission as claimed in claim 1 wherein there is provided an auxiliary hydraulic pump which is drivable by said input shaft.

References Cited

UNITED STATES PATENTS

| | | | |
|---|---|---|---|
| 2,235,370 | 3/1941 | Jandasek | 74—687 X |
| 2,390,240 | 12/1945 | DeLancey | 74—687 |
| 2,869,397 | 1/1959 | Weaving et al. | 74—687 |
| 2,924,123 | 2/1960 | Giles | 74—687 |
| 3,055,233 | 9/1962 | Giles | 74—687 |
| 3,132,534 | 5/1964 | Boehner | 74—687 |
| 3,266,253 | 8/1966 | Bryant | 60—53 |
| 3,405,573 | 10/1968 | Takekawa | 74—687 |
| 3,431,861 | 3/1969 | Martin | 103—120 |

ARTHUR T. McKEON, Primary Examiner

U.S. Cl. X.R.

60—53; 103—120